No. 606,974. Patented July 5, 1898.
W. LEUCKERT.
LAMP FOR BICYCLES.
(Application filed Feb. 8, 1897. Renewed Dec. 1, 1897.)
(No Model.)

WITNESSES:
Geo. W. Jaekel
Carl Kable

INVENTOR
William Leuckert
BY
Gauer & Raegener
ATTORNEYS.

UNITED STATES PATENT OFFICE.

WILLIAM LEUCKERT, OF BROOKLYN, NEW YORK.

LAMP FOR BICYCLES.

SPECIFICATION forming part of Letters Patent No. 606,974, dated July 5, 1898.

Application filed February 8, 1897. Renewed December 1, 1897. Serial No. 660,425. (No model.)

*To all whom it may concern:*

Be it known that I, WILLIAM LEUCKERT, a citizen of the United States, residing at Brooklyn, in the county of Kings and State of New York, have invented certain new and useful Improvements in Lamps for Bicycles, of which the following is a specification.

This invention relates to certain improvements in bicycle-lamps in which the light, instead of being thrown forward in direction of the axis of the lamp, is distributed at oblique angles of inclination to the axis of the lamp, so that a larger area is illuminated in front of the bicycle and simultaneously a side illumination in lateral direction is produced; and the invention consists of a lamp for bicycles and other vehicles which comprises a central source of light, a reflector arranged back of the same and formed of two central parabolic sections, the intersection of which is located in line with the axis of the lamp, a casing extending around the reflector and provided with two glass panels arranged at an obtuse angle of inclination in front of the source of light, and means for connecting the central front part of the casing, so as to hold tightly the glass fronts.

The invention consists, further, of certain details of construction, which will be fully described hereinafter and finally pointed out in the claims.

Figure 1:
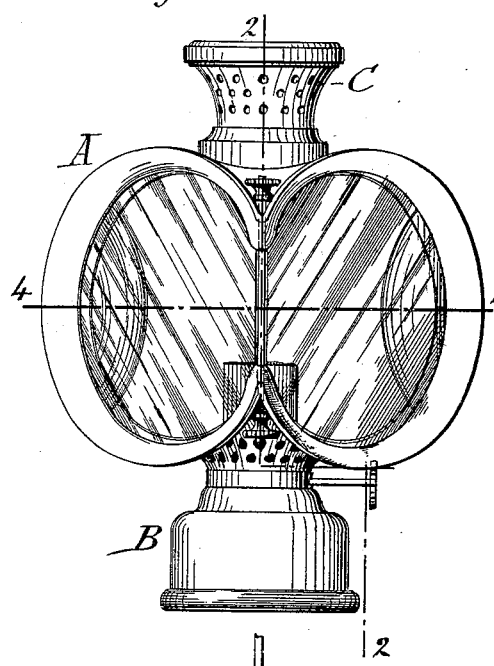
Figure 2:
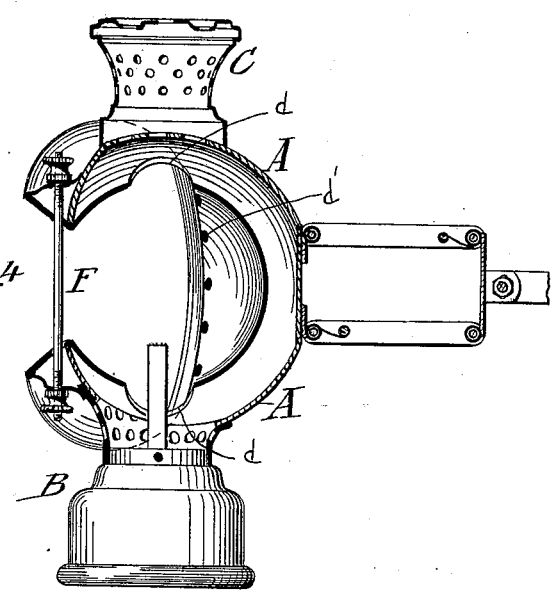
Figure 3:
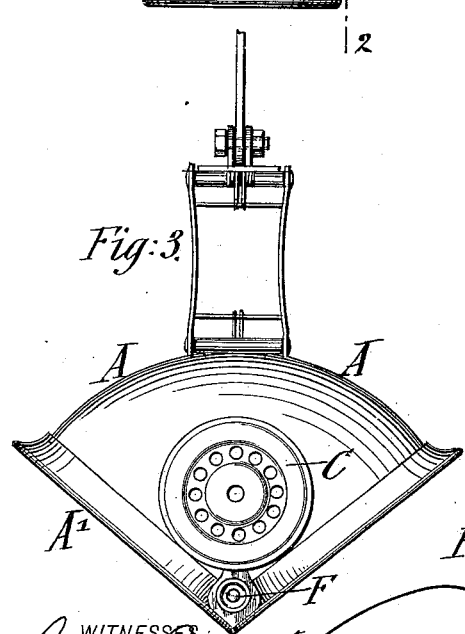
Figure 4:
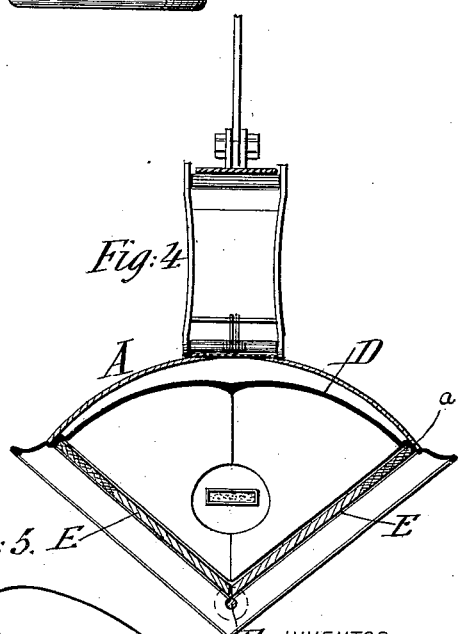
Figure 5:

In the accompanying drawings, Figure 1 represents a front elevation of my improved lamp for bicycles and other vehicles. Fig. 2 is a vertical central section on line 2 2, Fig. 1. Fig. 3 is a plan view; and Fig. 4 is a horizontal section on line 4 4, Fig. 1. Fig. 5 is a diagrammatic view showing the manner of obtaining the proper relative position of the two sections.

Similar letters of reference indicate corresponding parts.

Referring to the drawings, A represents the exterior casing or shell of my improved lamp for bicycles and other vehicles. The casing is made approximately in the shape of a portion of a section of a sphere and arranged to support on its lower portion the oil-lamp B or other source of light, the flame of which is located in line with the axis of the casing and directly in front of and centrally with the apex of the angle formed by the intersecting parabolic curves. The lamp-fount is either permanently attached to the lower part of the casing A or connected with the same by bayonet-joint, so that it can be readily filled, trimmed, replaced, lighted, &c. To the upper part of the casing A is applied a perforated chimney-cap C, through which the products of combustion are drawn off to the outside. The lower part of the casing at point of connection with the lamp-fount B is likewise perforated to permit the passage of the required quantity of air to the flame for keeping up the draft. The perforated chimney-cap is made in a suitable ornamental form, so as to be in keeping with the fount on the lower part of the casing A.

At the interior of the casing or shell A is arranged, back of the source of light, a reflector D, which is formed of two sections, each of parabolic shape, said sections being so arranged as to intersect each other in the center plane of the lamp, each section forming a portion of a parabola of comparatively flat curvature. The reflector-sections D are provided with openings $d\ d$ at its top and bottom and with perforations $d'$ at its edge, so that the circulation of the air to the flame is kept up and also the air conducted into the space between the shell and reflector. This circulation of air not only keeps the reflector cool, but also produces an equilibrium of pressure at both sides of the same. The reflector-sections are arranged to abut at an obtuse angle to the center plane of the lamp, as shown in Fig. 4, and are so arranged that the light-rays reflected by them cross each other adjacent to and in front of the foci of the parabolic sections and are dispersed in two radiating bodies of light, whereby a wider area, without any diminution in the body of light supplied, is thrown in front of the lamp. The best arrangement of the sections is obtained by locating one arm of each of two equal parabolic curves at $a$ in the diagram shown, Fig. 5, and extending each of said curves in opposite direction to the points $b$ $d$. The point of intersection $c$ of these two curves indicates the apex of the obtuse angle, which is located directly back of and in the center of the light.

The front part of the casing A is made of forward-projecting angular shape. The apex of the angle is located in front of the source of light in the center plane of the lamp. The casing is provided with circular grooves $a$ and rims A′ at the angular portion, said grooves serving for supporting the glass fronts E, which are retained in position by a front pillar F, which connects the forward-projecting upper and lower ends of the casing A. The pillar F is made in the form of a rod that passes through holes in the casing, it being threaded at both ends and attached by means of suitable screw-nuts to the forward-projecting portions of the casing, so as to bind them firmly together and apply the grooves $a$ tightly around the glass fronts E. The fronts are made of circular shape, with the exception of the portions where they abut, and are ground off at the same angle of inclination as that of the projecting forward portions of the casing, so that a tight fit of the glass fronts is obtained and the ingress of air to the interior of the lamp prevented.

The connecting-pillar F is arranged in front of the abutting edges, but within the center plane of the lamp. When the fastening screw-nuts are removed from the pillar F, the forward-projecting portions of the casing A are spread apart, whereby the removal of the glass fronts is permitted and the replacing of the same after they are cleaned or in case of breakage for reinserting a new glass front. The glasses may be partly colored in red or other color at their sides, so as to shut off a portion of the light emitted and act in the nature of signal-lights, especially when used for trolley-cars and other vehicles, as indicated in Fig. 1. By making the lamp in a smaller size it forms a very effective lamp for bicycles, while when made on a large scale it can be used for trolley-cars, also for hallways, and on a still larger scale for outdoor illuminating purposes generally. When used for a bicycle-lamp, the casing is provided at its rear part, also in line with the center plane of the lamp, with the usual spring-frame by which it is connected to the front of the bicycle.

Having thus described my invention, I claim as new and desire to secure by Letters Patent—

1. A lamp for bicycles and other vehicles, composed of a lamp or other source of light, a reflector arranged back of the same and formed of two parabolic sections that are adapted to intersect at an obtuse angle of inclination in the center plane of the lamp, an exterior casing extending around the reflector and provided with angular forward-projecting portions, glass fronts supported at an obtuse angle by the front part of the casing, and means for connecting the forward-projecting front portions of the casing, substantially as set forth.

2. A lamp for bicycles and other vehicles, consisting of a lamp or other source of light, a reflector back of the same and formed of two parabolic sections arranged to intersect each other at an obtuse angle of inclination in line of the center plane of the lamp, a casing extending around the reflector and provided with forward-projecting angular portions, grooved seats and rims, glass fronts supported by said front forward-projecting portion of the casing and adapted to abut in line in front of the source of light, in a line with the side plane of the lamp, and means for applying the front part of the casing tightly to the glasses, substantially as set forth.

3. A lamp for bicycles and other vehicles, consisting of a lamp or other source of light, a casing applied to the body of said lamp, a perforated chimney-cap at the upper part of the casing, vertically above the light, a reflector located in the casing, formed of two parabolic sections intersecting in the vertical central plane of the lamp, angular front glasses arranged at an angle, the backs of which are in line with said center plane, and supported by angular forward-projecting portions of the casing, a center pillar located in front of the abutting glasses connecting the forward-projecting portions of the casing so as to apply the same tightly to the glasses, substantially as set forth.

In testimony that I claim the foregoing as my invention I have signed my name in presence of two subscribing witnesses.

WILLIAM LEUCKERT.

Witnesses:
PAUL GOEPEL,
GEO. W. JAEKEL.